(12) United States Patent
Benedictus et al.

(10) Patent No.: US 7,615,088 B2
(45) Date of Patent: Nov. 10, 2009

(54) CYCLONIC SEPARATOR FOR SEPARATING PARTICLES FROM AN AIRFLOW AND VACUUM CLEANER INCLUDING SUCH A SEPARATOR

(75) Inventors: Jan Hans Benedictus, Drachten (NL); Fred Fraij, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 584 days.

(21) Appl. No.: 10/567,036

(22) PCT Filed: Jul. 28, 2004

(86) PCT No.: PCT/IB2004/051311
§ 371 (c)(1),
(2), (4) Date: Feb. 2, 2006

(87) PCT Pub. No.: WO2005/011460
PCT Pub. Date: Feb. 10, 2005

(65) Prior Publication Data
US 2006/0196154 A1    Sep. 7, 2006

(30) Foreign Application Priority Data
Aug. 4, 2003   (EP) .................................. 03102425

(51) Int. Cl.
*B01D 45/12* (2006.01)

(52) U.S. Cl. ............................ 55/337; 55/408; 55/409; 55/457; 55/459.1

(58) Field of Classification Search .................. 55/337, 55/400, 406, 408, 409, 457, 459.1
See application file for complete search history.

(56) References Cited

U.S. PATENT DOCUMENTS

| | | | | |
|---|---|---|---|---|
| 3,655,058 | A * | 4/1972 | Novak | ...................... 210/360.1 |
| 6,090,174 | A | 7/2000 | Douma et al. | |
| 2002/0148071 | A1 | 10/2002 | Lee et al. | |

FOREIGN PATENT DOCUMENTS

| | | |
|---|---|---|
| DE | 19829079 A1 | 1/2000 |
| WO | 199823381 A1 | 6/1998 |
| WO | 200032297 A1 | 6/2000 |

* cited by examiner

*Primary Examiner*—Robert A Hopkins

(57) ABSTRACT

A cyclonic separator for separating particles and/or liquids from an airflow using means for causing the air to follow a cyclonic flow pattern through the separating chamber (12; 112; 212) and around an axis (17; 117) for causing cyclonic separation of a least a portion of the particles and/or liquids from the airflow within the separating chamber (12; 112; 212). An interior surface portion of a drum (18; 118; 218) bounding the separating chamber (12; 112; 212) and extending circumferentially around the axis (17; 117) is rotatable about the axis (17; 117) so that separation of particles and/or liquid from the airflow is improved. A vacuum cleaner including such a separator is also described.

12 Claims, 4 Drawing Sheets

CYCLONIC SEPARATOR FOR SEPARATING PARTICLES FROM AN AIRFLOW AND VACUUM CLEANER INCLUDING SUCH A SEPARATOR

The invention relates to a cyclonic separator according to the introductory portion of claim 1 and to a vacuum cleaner including such a cyclonic separator.

Cyclonic separators for separating particles and or liquids from an airflow are well known. An example of such a separator is described in international patent application WO 98/23381. In this separator, a fan is arranged in the inlet to the cyclonic separator to accelerate liquid towards the interior wall of the separator, thereby giving the air more tangential velocity for causing particles to be separated from the airflow without the need of a more powerful motor to create a higher airflow rate.

It is an object of the invention to improve the separation of dust particles and/or liquid by cyclonic separation, in particular with respect to small particles and/or small liquid droplets.

According to the present invention this object is achieved by providing a separator according to claim 1. The invention can also be embodied in a vacuum cleaner according to claim 12, which includes such a cyclonic separator.

The rotation of the drum or drums in the sense of rotation of the cyclonic airflow reduces the differences in velocity between the airflow and circumferential interior surfaces of the drum along which the cyclonic airflow passes. In turn, this prevents or at least counteracts disturbances of the airflow in at least a portion of the separating chamber where the airflows along the rotating drum, so that fewer particles and/or liquid droplets reach the entry of the outlet opening. In particular, mist of fine droplets and fine particles that are easily entrained by such disturbances, and thereby prevented from being centrifuged out of the airflow, stick more easily to the circumferential wall. Furthermore, due to the rotation of the circumferential wall of the drum, a cake of caught particles sticks more firmly to the circumferential wall of the drum due to the centrifugal forces exerted thereon and are less easily entrained by the airflow, due to the low velocity of the cyclonic airflow relative to the interior surface of the circumferential wall.

Particular embodiments of the invention are set forth in the dependent claims.

Further aspects, effects and details of the invention will now be described with reference to the accompanying drawings, wherein.

Figure 1:
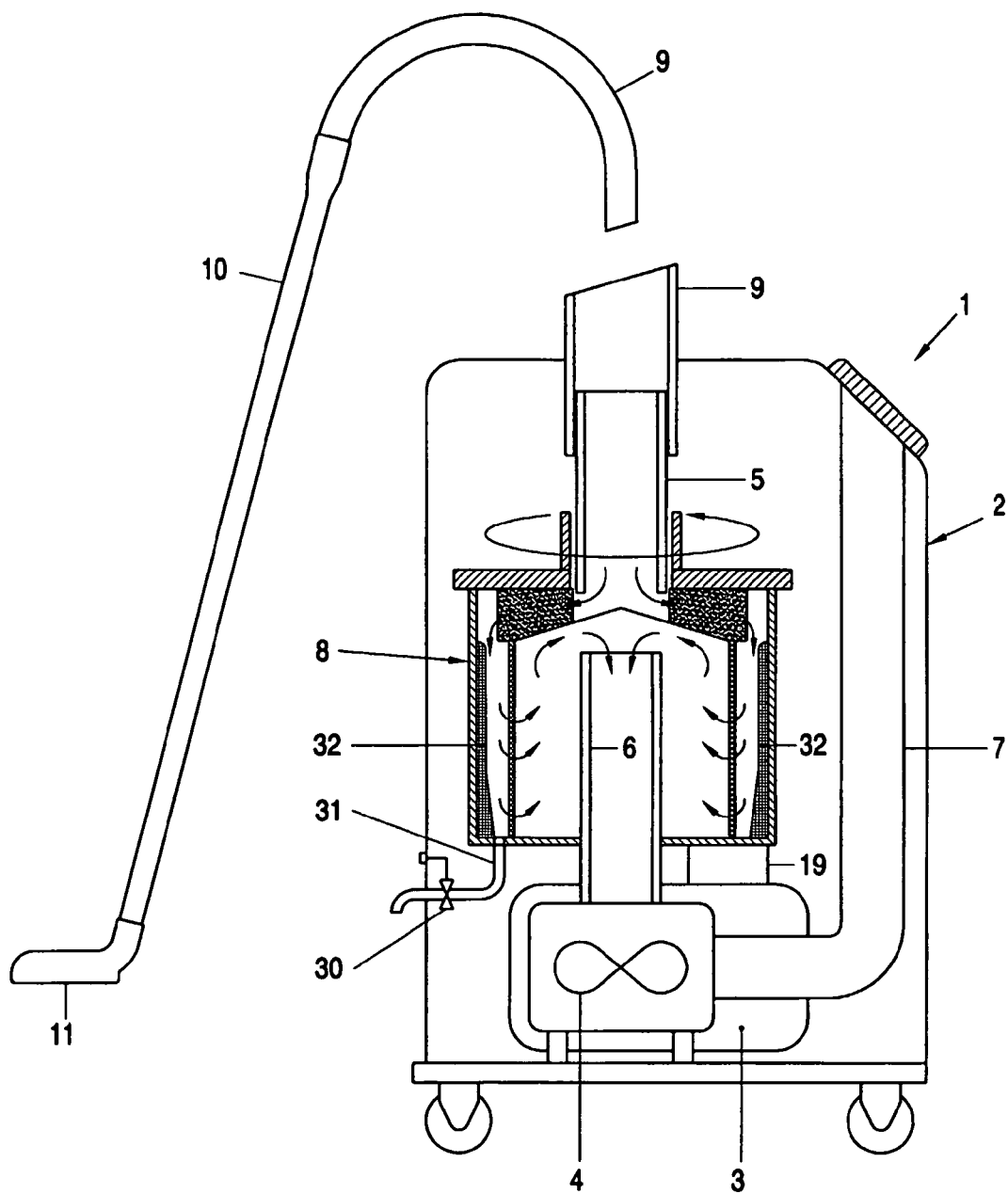
FIG. 1 is a schematic longitudinal sectional view of a vacuum cleaner including a cyclonic separator according to a first embodiment of the invention.

In FIG. 1, an example of a vacuum cleaner according to the invention is shown. The vacuum cleaner according to this example is suitable for collecting both solid and liquid material. However, the present invention may also be applied to vacuum cleaners that are not suitable for collecting liquids. The vacuum cleaner 1 according to this example includes a housing 2 and, inside the housing 2, a motor 3, a fan 4 coupled to the motor 3, air guiding conduits 5-7 and a separator 8 for separating solid particles and liquids from the airflow in which the particles and liquids have been entrained. A vacuum cleaner hose 9 and tube 10 and a nozzle 11 to be moved along surfaces to be cleaned for picking up particles and liquids from the surface to be cleaned are connected to the housing 2. A discharge conduit 31 connects to the separator 8 and a valve 30 is provided for closing-off the discharge conduit 31 except when opened for allowing the discharge of collected liquids from the separator 8 via the discharge conduit 31.

The motor 3 and the fan 4 are arranged for driving an airflow through the nozzle 11, the tube 10, the hose 9, the air guiding conduits 5-7 and the separator 8.

Figure 2:
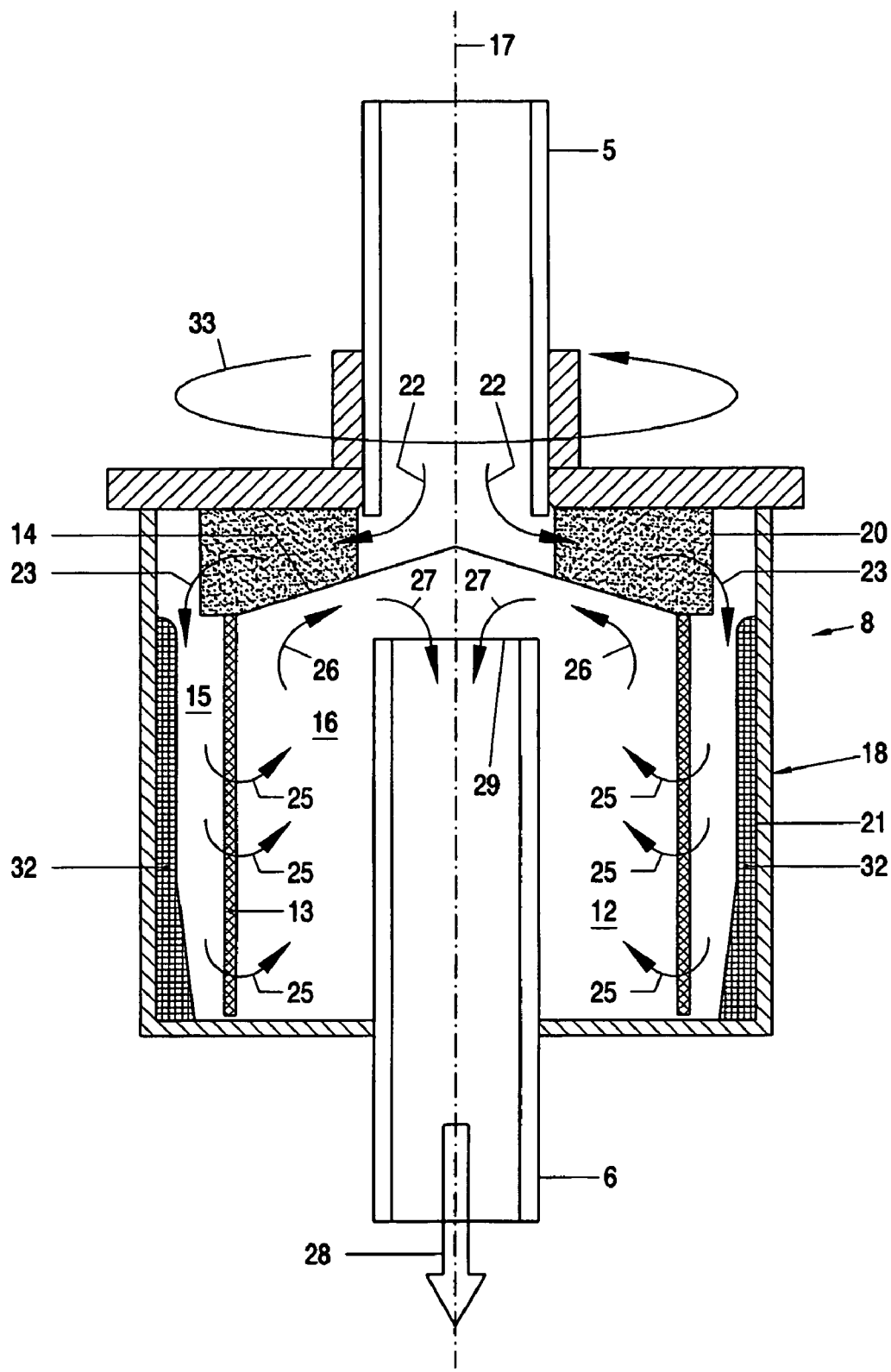
FIG. 2 is a schematic longitudinal sectional view of the cyclonic separator of the vacuum cleaner according to FIG. 1.

The separator is described in more detail with reference to FIG. 2. The cyclonic separator 8 according to FIG. 2 is particularly suitable for separating both liquids and particles from an airflow entering via the inlet conduit 5 and leaving via the outlet conduit 6.

For carrying out the separation, a separating chamber 12 is provided, into which the inlet conduit 5 debouches. In the chamber 12, a dividing drum 13 is arranged, which has a closed top end 14. The dividing drum 13 and the top end 14 divide the chamber 12 into an outer annular portion 15 and an inner portion 16 and to an important extent separate a mainly downward helical airflow in the outer annular portion 15 from a mainly upward helical airflow in the inner portion 16 of the separating chamber 12, so that disturbance of the airflow is further reduced.

Moreover, the circumferential wall of dividing drum 13 preferably includes a preferably fine air-grid, having holes with a pitch of preferably less than 1 mm, which catches small droplets and thereby prevents a large portion of the small, mistlike droplets from reaching the outlet 6.

A cyclone drum 18 that bounds the separating chamber 12 is rotatably suspended and coupled to the motor 3 via a drive 19 schematically shown in FIG. 1. The rotation of the cyclone drum causes the air to generally follow a cyclonic path through the separating chamber 12, for causing cyclonic separation of particles and/or liquids from the airflow (arrows 22, 23, 25-27) through the separating chamber 12.

In an upper portion of the outer chamber portion 15, radially extending blades 20 are arranged that rotate with the cyclone drum 18 when the motor 3 is rotating. The blades may be aerodynamically curved. The cyclone drum 18 has a circumferential wall 21 circumferentially extending around the centerline 17 of the cyclonic flow and bounding the separating chamber 12. The circumferential wall 21 of the cyclone drum 18 and the dividing drum 13 are spaced radially outwardly from the entry portion 29 of the outlet 6. It is observed that, according to this example, the cyclone drum 18 has a cylindrical shape, but that this cyclone drum may also be of another shape, for instance having a non-circular cross-section or a cross-section that varies in the direction of the axis 17. To avoid vibrations, the cyclone drum 18 and its internals are preferably balanced about the axis 17.

In operation, the cyclone drum 18 and the divider drum 13 and the blades 20 fixedly mounted therein are rotated about the axis 17 as is indicated by an arrow 33. The rotation of the blades 20 is particularly effective for imparting rotation to the airflow about the axis 17 of rotation and thereby drives the rotation of the airflow 22-27 through the separating chamber 12. Dirt is separated from the airflow due to the centrifugal forces caused by the rotation of the airflow and by the sudden changes in direction of the airflow while a tangential velocity is imparted thereon upon entering at the top of the divider drum 13 (arrows 23), and said dirt is collected against the circumferential wall 21 of the drum 18, where it forms a cake 32 of collected dirt.

Because the velocity of the airflow relative to the surfaces of the drums 13, 18 is relatively low, disturbance of the airflow is at least reduced, so that disturbance of the outward movement of liquid droplets and particles to the inwardly facing circumferential surfaces of wall portions 21 of the drum 18 is avoided, or at least reduced. If liquids are collected, a particular advantage is that foam formation is counteracted, which is of particular interest if liquids containing cleaning agents are collected. Furthermore, once liquid and particles stick to the interior surfaces of the drum 18, they are less easily dislodged from the layer 32, because of the low relative velocity of the airflow along the surfaces to which the particles are stuck. In particular, the formation and whirling up of fine particles due to particles hitting separated material on interior surfaces in the chamber 12 at high relative velocities is counteracted, because the particles hit these surfaces at low velocities relative to that separated material 32.

Accordingly, the airflow 28 leaving the separating chamber 12 will contain less dirt and/or liquid.

The cyclone drum 18 preferably has a diameter of about 10 to 40 cm and is preferably rotated at about 300 to 1500 rpm and more preferably at about 500 to 1000 rotations per minute. Because the rotation of the airflow is driven by the rotation of impellers in the separating chamber 12 rotating with the drums 13, 18, the tangential velocity of the airflow is automatically substantially equal to the tangential velocity of the surfaces of the drums 13, 18 contacted by the airflow. For an equal circumferential distribution of dirt over the inwardly facing circumferential surfaces in the separating chamber 12, a slight difference between the angular velocity of the drum and the angular velocity of the airflow may be maintained.

Another advantage of driving the rotation of the airflow by the rotation of a driven rotatable drum is that the tangential velocity of the air in the separating chamber 12 can be very high, independently of the flow rate of the airflow through the inlet 5 and the outlet 6. Therefore, relatively little motor power is sufficient for causing a strong centrifugal effect.

In particular the rotation of the circumferential wall 21 of the cyclone drum 18 bounding the separating chamber 12 causes separated liquids and particles to stick reliably to the rotating circumferential interior walls of the separating chamber 12 due to the centrifugal forces to which the separated substance 32 is subjected. Moreover, the formation and whirling up of fine particles due to particles hitting the separated material 32 on circumferential inwardly facing surfaces in the chamber 12 is counteracted, because of the centrifugal forces that assist in keeping particles 32 stuck to the rotating, inwardly facing surfaces from displacing away from these surfaces.

The inlet and outlet tubing enters and leaves, respectively, the separating chamber 12 coaxially with the axis 17 of rotation of the cyclone drum 18 in which the chamber 12 is located, so that the connection between the rotatable cyclone drum 18 and the inlet and outlet tubing can be sealed off with a relatively simple seal.

It is also favorable, for simplicity of construction, that the inlet 5 and the outlet 6 enter and leave, respectively, the separating chamber 12 at axially opposite ends of the cyclone drum 18, since this avoids the need of arranging both the inlet and the outlet in the center of the same end of the rotatable cyclone drum.

In particular if the inlet 5 and the outlet 6 pass through axially opposite ends of the drum 18 and the inlet opening and the outlet opening face in axially opposite directions, it is advantageous that the divider drum 13 shields the outlet opening 6 from the inlet opening, so that air and in particular liquid particles entrained therein are to a large extent prevented from passing along a short path from the inlet to the outlet opening, while having been subjected to the separating effect of the cyclonic airflow too briefly to have been separated therefrom. The dividing drum 13 shielding the entry opening of the inlet 5 from a peripheral portion 15 of the separating chamber 12 causes the air to flow mainly along a helical trajectory, first through the peripheral portion 15 of the separating chamber 12 and then through a core portion 16 of the separating chamber 12, and also has the effect of precluding disturbances in the flow from reaching the entry 29 of the outlet 6.

The entry portion 29 of the outlet 6 is located inside a portion of the divider drum 13, so that the divider drum effectively shields the entry of the outlet 6 from dirt and droplets in the airflow in the outside portion 15 of the chamber 12.

Figure 3:
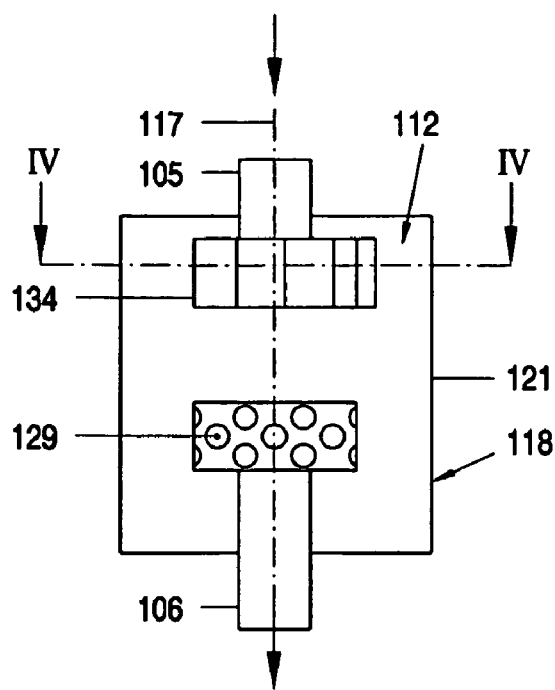
FIG. 3 is a view, similar to FIG. 2, of a separator according to a second embodiment of the invention.
Figure 4:
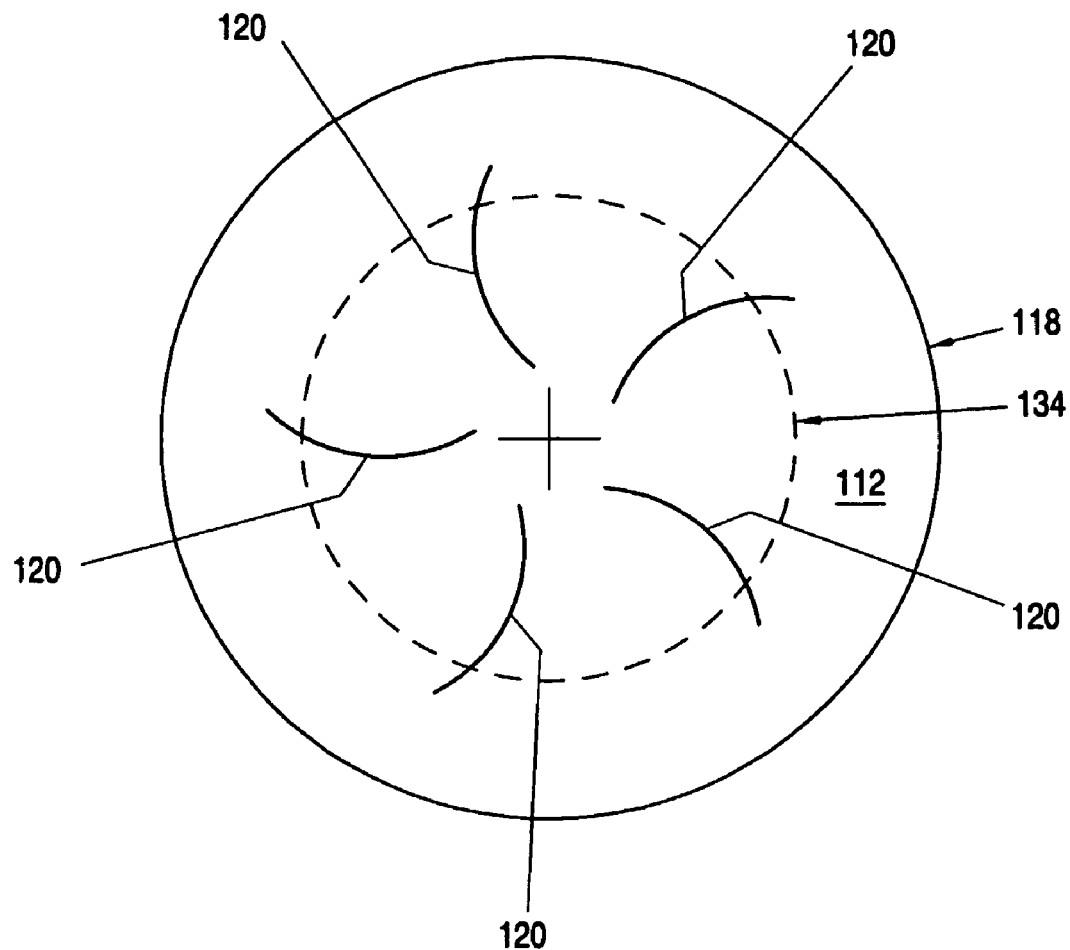
FIG. 4 is a sectional view along the line IV-IV in FIG. 3.

In FIGS. 3 and 4, a second example of a separator according to the invention is shown, in which the separating chamber 112 is arranged between an inlet 105 and an outlet 106. For imparting rotation to the airflow in the chamber 112, the air is first passed through a stationary outflow head 134 having curved blades 120, from which outflow head the airflows out radially and with tangential directional components. Next, the cyclonic rotation of the airflow is further enhanced by the rotation of the drum 118. The separator according to this example is particularly suitable for processing air entraining dry particles only.

It is also possible to drive rotation of the outflow head 134 for imparting tangential velocity to the airflow, but a stationary outflow head 134 is more advantageous from the point of view of simplicity of construction. More in general, it is advantageous to provide that the circumferential wall 121 of the cyclone drum 118 rotates relative to the outflow head (to this end, the outflow head may rotate faster or slower or be stationary, as in the present example), because it is thus achieved that dirt entering the separating chamber via the outflow head is evenly distributed in circumferential sense over the circumferential wall 121 of the cyclone drum 118.

Figure 5:
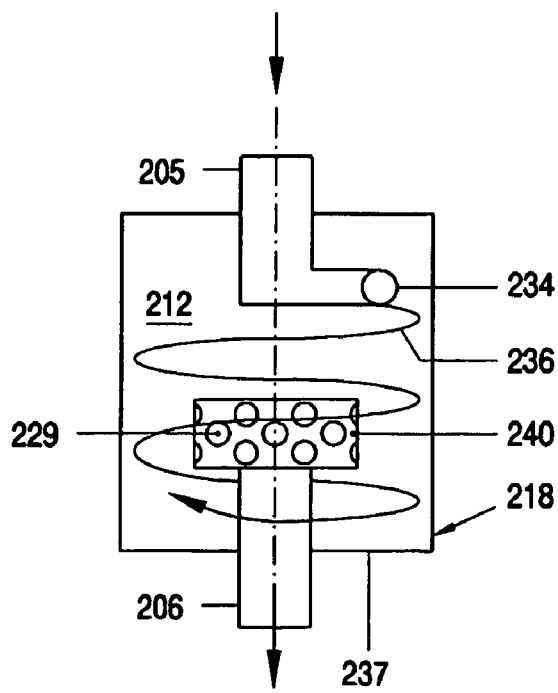
FIG. 5 is a view, similar to FIGS. 2 and 3, of a separator according to a third embodiment of the invention.

In FIG. 5, yet another embodiment of the separator according to the invention is shown in which, in operation, the cyclonic airflow (arrow 236) is jetted from an inlet port 234 directed in a direction with a tangential component into the separating chamber 212 in a direction with a tangential component. Also according to this example, the cyclone drum 218 is driven to rotate in the sense of rotation of the cyclonic airflow 236.

The entry portions 229 of the outlet 206 are arranged spaced away from the axial end 237 of the separating chamber 212 opposite the inlet port 234 and face in a direction having a radially outward component only, because the top and the bottom of a filter unit 240 at the entry 229 of the outlet 206 are closed. This requires air that has reached the axial end 237 of the separating chamber 212 opposite the inlet port 234 to pass via an outward portion of the separating chamber 212, where any entrained droplets and particles are further or again subjected to the separating action of the centrifugal forces in the rotating airflow, before the air reaches the entries 229 of the outlet 206. This principle is also applied in the separator shown in FIGS. 3 and 4.

The filter unit 240 downstream of the separating chamber 212 filters out particles that are too small and/or too light to be separated by the centrifugal effect of the cyclonic airflow. The filter unit 240 does not clog up quickly because it only catches a very fine fraction of the dirt that has entered the separating chamber 212. The filter unit 240 may also be rotated with the cyclonic airflow to keep relative velocities between the cyclonic airflow and surfaces in the separating chamber down, so that disturbance of the airflow is further reduced. A further effect of rotation of the filter unit is that dirt can be centrifuged out of the filter, in particular if the filter unit is rotated while there is no airflow out of the outlet 106, 206.

Having described the invention, many modifications thereto will become apparent to those skilled in the art without deviation from the invention as defined by the scope of the appended claims. For instance, both of the ends of the rotatable drum or one or more of the drums may be partially closed or open, and open ends of the rotatable drum or drums may be closed off by stationary end members. The surfaces or structures of the drum or drums extending around the axis of rotation may be circular, but do not have to be circular.

The invention claimed is:

1. A cyclonic separator for separating particles and/or liquids from an airflow comprising:
    a separating chamber;
    an inlet for letting a flow of air entraining particles and/or liquids into said separating chamber; and
    an outlet for letting a flow of air, from which at least a portion of the entrained particles and/or liquids has been separated, out of the separating chamber, the outlet having at least one entry;
    means for causing the airflow to follow a cyclonic flow pattern through the separating chamber and around an axis for causing cyclonic separation of at least a portion of the particles and/or liquids from the airflow within the separating chamber; and
    at least one drum of which at least one interior surface portion extends circumferentially around said axis and bounds said separating chamber;
    wherein the at least one interior surface portion extending circumferentially around said axis is rotatable about said axis, wherein the inlet and the outlet enter and leave, respectively, the separating chamber coaxially with the axis of rotation of the drum bounding the separating chamber.

2. A cyclonic separator according to claim 1, wherein the inlet and the outlet enter and leave, respectively, the separating chamber at axially opposite ends of the drum bounding the separating chamber.

3. A cyclonic separator according to claim 2, wherein an exit opening of the inlet and an entry opening of the outlet face in axially opposite directions, and wherein at least one divider drum situated in, and coaxial with, the separating chamber shields the entry opening of the outlet from the exit opening of the inlet.

4. A cyclonic separator according to claim 3 therein said at least one divider drum has a circumferential wall with radially extending perforations, of which circumferential wall at least one portion is spaced radially outwardly from the at least one entry portion of the outlet.

5. A cyclonic separator according to claim 4, wherein the circumferential wall of the divider drum includes an air-grid having at least one portion circumferentially extending around said axis.

6. A cyclonic separator according to claim 1, the means for causing the airflow to follow a cyclonic flow pattern through the separating chamber including a plurality of circumferentially distributed blades for imparting tangential velocity to said airflow.

7. A cyclonic separator according to claim 1, wherein said rotatable drum is adapted to rotate at a velocity about equal to the tangential velocity of the cyclonic airflow in the separating chamber.

8. A cyclonic separator according to claim 1, including a motorized drive structure for driving the rotation of said rotatable drum.

9. A cyclonic separator according to claim 1, wherein the at least one entry of said outlet is arranged spaced from an end of the separating chamber opposite an end where the inlet debouches into the separating chamber and facing in a direction having a radially outward component.

10. A cyclonic separator according claim 1, wherein the at least one entry of the outlet is provided with a filter.

11. A cyclonic separator according to claim 10, wherein said filter is rotatable about said axis.

12. A vacuum cleaner having a motor, a fan coupled to said motor, air guiding conduits and a cyclonic separator having a separating chamber for separating particles and/or liquids from an airflow through the air guiding conduits and the separating chamber, which airflow is generated by the motor and the fan, characterized in that the cyclonic separator is a cyclonic separator as claimed in claim 1.

\* \* \* \* \*